US008872013B2

(12) United States Patent
Cooper et al.

(10) Patent No.: US 8,872,013 B2
(45) Date of Patent: Oct. 28, 2014

(54) AUDIOVISUAL TEACHING APPARATUS

(71) Applicants: Cliff Cooper, Loughton (GB); Clifford William Cooper, London (GB); Andrew Fallon, Belmont (GB); Colin Arrowsmith, Rowlands Gill (GB)

(72) Inventors: Cliff Cooper, Loughton (GB); Clifford William Cooper, London (GB); Andrew Fallon, Belmont (GB); Colin Arrowsmith, Rowlands Gill (GB)

(73) Assignees: Orange Music Electronic Company Limited (GB); KBO Dynamics International Ltd. (GB)

( * ) Notice: Subject to any disclaimer, the term of this patent is extended or adjusted under 35 U.S.C. 154(b) by 51 days.

(21) Appl. No.: 13/801,392

(22) Filed: Mar. 13, 2013

(65) Prior Publication Data
US 2013/0239779 A1 Sep. 19, 2013

(30) Foreign Application Priority Data

Mar. 14, 2012 (GB) .................................. 1204537.3
Jan. 28, 2013 (GB) .................................. 1301448.5

(51) Int. Cl.
*G10H 1/18* (2006.01)
(52) U.S. Cl.
USPC ............................................. 84/615; 84/653
(58) Field of Classification Search
USPC .................................... 84/615, 653
See application file for complete search history.

(56) References Cited

U.S. PATENT DOCUMENTS 2,791,147 A * 5/1957 Meadows ..................... 84/470 R
4,980,519 A * 12/1990 Mathews .................... 178/19.01
6,388,183 B1 * 5/2002 Leh ................................. 84/645
2003/0167908 A1 * 9/2003 Nishitani et al. ............... 84/723
2003/0189582 A1 * 10/2003 Pinsky .......................... 345/684
2006/0288842 A1 * 12/2006 Sitrick et al. ................ 84/477 R
2007/0261536 A1 * 11/2007 Shen et al. .................... 84/609
2010/0263518 A1 * 10/2010 Nishitani et al. ............... 84/612
2012/0057012 A1 * 3/2012 Sitrick et al. ................... 348/77
2013/0118339 A1 * 5/2013 Lee et al. ....................... 84/725
2014/0033903 A1 * 2/2014 Araki et al. .................... 84/612

FOREIGN PATENT DOCUMENTS

| CN | 2230956 Y | 7/1996 |
| CN | 2924681 Y | 7/2007 |
| GB | 2453203 A | 8/2008 |
| WO | 2011107797 A1 | 9/2011 |

OTHER PUBLICATIONS

UK Search Report, GB1204537.3, Jan. 24, 2013.

* cited by examiner

*Primary Examiner* — David S. Warren
(74) *Attorney, Agent, or Firm* — Polster Lieder

(57) ABSTRACT

The audiovisual teaching apparatus (2) for demonstration purposes before a group of students has a frame (6) on which is mounted a board (4). The front surface of the board (4) includes an area (5) treated to function as a whiteboard surface on which standard dry-maker pens can be used to removably write and draw on the surface. The whiteboard surface (5) is pre-printed with a plurality of musical staves (8) and has an array of substantially parallel conductive tracks aligned with the lines and spaces of the musical staves (8). The conductive tracks are connected to sound reproduction apparatus and a hand-held wand (24), which includes a localized antenna, is adapted to select an individual line or space of the musical stave (8) so that the selected note is played by the sound reproduction apparatus.

18 Claims, 3 Drawing Sheets

AUDIOVISUAL TEACHING APPARATUS

CROSS-REFERENCE TO RELATED APPLICATIONS

This application claims the benefit of Great Britain Application Number GB 1204537.3, filed on Mar. 14, 2012; and Great Britain Application Number GB 1301448.5, filed Jan. 28, 2013.

The disclosures of the above applications are incorporated herein by reference.

FIELD

The present disclosure relates to an audiovisual teaching apparatus. In particular, it relates to an audiovisual teaching apparatus for teaching music.

BACKGROUND

The statements in this section merely provide background information related to the present disclosure and may not constitute prior art.

Known audiovisual teaching devices for teaching music comprise a board containing multiple musical staves. A series of wires or low resistance metallic strips represent the lines and spaces of the musical staves and are arranged to conduct current pulses of relatively high amplitude. The devices further comprise a handheld "wand" which includes an inductor and is connected to the board via a cable. When the wand makes contact with or adjacent one of the wires of the musical stave this closes a circuit that drives an integrated loudspeaker system.

There are a number of disadvantages with these known devices. Firstly, the wand needs to be tethered to the music board using a heavy duty screened cable. Moreover, the orientation of the inductor does not allow accurate sensing of the wires/metallic strips. This can cause errors in establishing which wires/metallic strips of the musical stave have been detected. Also, the mechanical orientation and fixing of the wires/metallic strips is difficult to achieve. Finally, the use of high current, high frequency pulses with a fast rising edge generates large amounts of radio frequency interference, thus making EMC compliance difficult to achieve.

SUMMARY

The present disclosure aims to overcome or substantially mitigate the above problems with the known devices.

According to one aspect there is provided an audiovisual teaching apparatus for use in teaching music comprising: a substrate; a sensing plane formed of a first array of conductive tracks provided on the substrate, each of the conductive tracks of the first array being associated with a respective different musical note of a musical stave; a second array of conductive tracks provided on the substrate, the second array of conductive tracks being interspersed with the first array of conductive tracks; sound reproduction apparatus; a music controller in communication with the first array of conductive tracks and with the sound reproduction apparatus; and an untethered handheld antenna whereby, when a conductive track of the first array receives a signal transmitted by the handheld antenna, the controller is adapted to cause the sound reproduction apparatus to generate a sound corresponding to the musical note associated with the conductive track that received the transmitted signal.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

An exemplary embodiment of the present disclosure will now be described, by way of example only, with reference to the accompanying drawings, in which.

It should be understood that throughout the drawings, corresponding reference numerals indicate like or corresponding parts and features.

DETAILED DESCRIPTION

Figure 1:
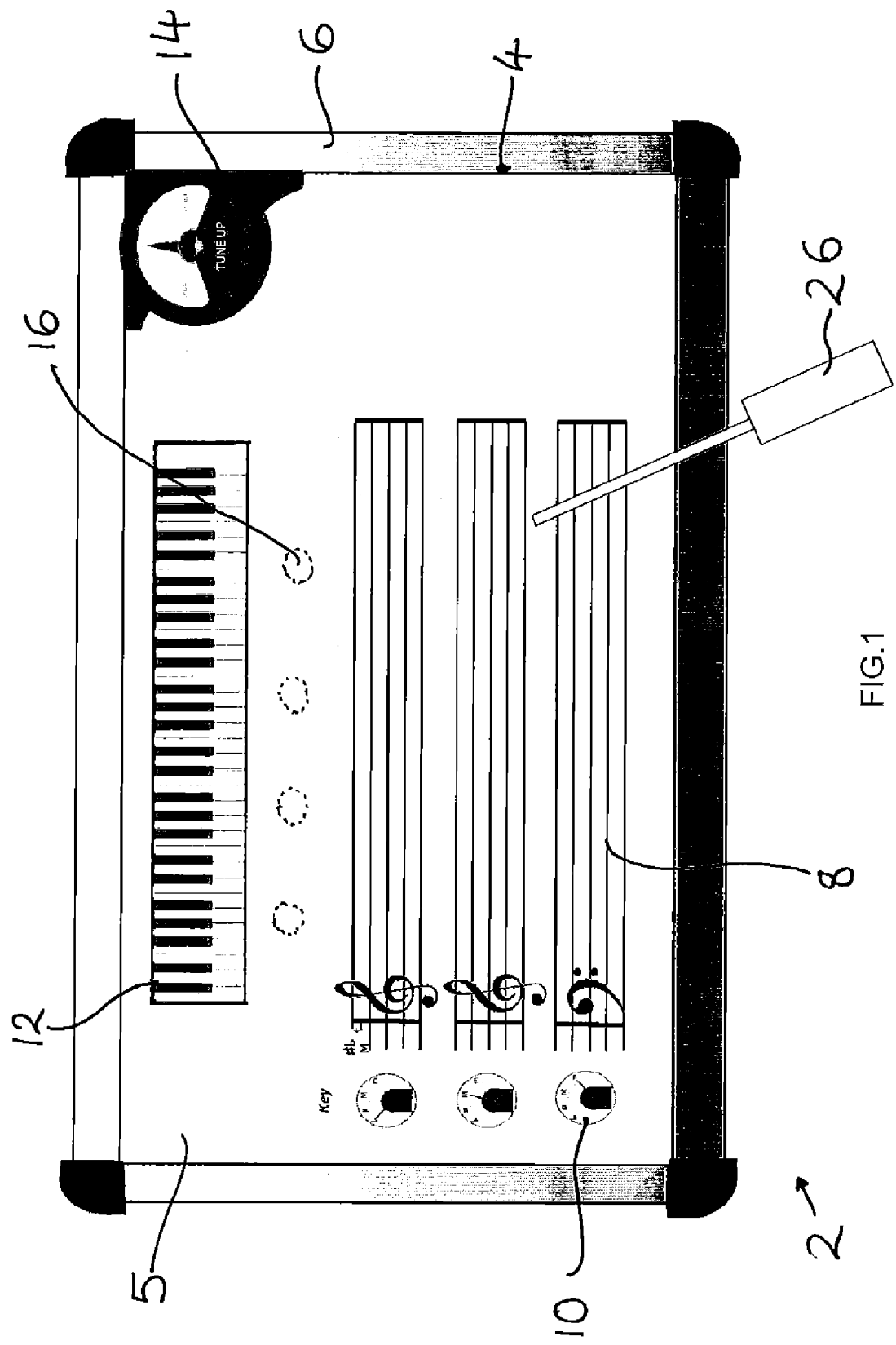
FIG. 1 is front view of an embodiment of an audiovisual teaching apparatus in accordance with one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

According to one exemplary embodiment there is provided an audiovisual teaching apparatus for use in teaching music comprising: a substrate; a sensing plane formed of a first array of conductive tracks provided on the substrate, each of the conductive tracks of the first array being associated with a respective different musical note of a musical stave; a second array of conductive tracks provided on the substrate, the second array of conductive tracks being interspersed with the first array of conductive tracks; sound reproduction apparatus; a music controller in communication with the first array of conductive tracks and with the sound reproduction apparatus; and an untethered handheld antenna whereby, when a conductive track of the first array receives a signal transmitted by the handheld antenna, the controller is adapted to cause the sound reproduction apparatus to generate a sound corresponding to the musical note associated with the conductive track that received the transmitted signal.

The teaching apparatus as described herein provides the teacher with similar teaching functionality but greater freedom of movement in comparison to previous teaching apparatus.

Each of the conductive tracks of the first array is separately addressable and in a preferred embodiment all of the conductive tracks of the first and second arrays are arranged substantially parallel with one another. The present disclosure is partially based upon the innovative realisation that audiovisual teaching apparatus used in the teaching music does not require x,y co-ordinate discrimination because the x co-ordinate of a musical stave is representative of time. Only discrimination of the y co-ordinate is required to distinguish between notes. Hence, in some embodiments, ideally the substrate of the audiovisual teaching apparatus has no conductive tracks orthogonal to the first and second arrays. This greatly simplifies the construction of the audiovisual teaching apparatus, simplifies addressing of the individual tracks of the first array and reduces the risk of undesirable EMC effects.

Preferably, each conductive track of the first array includes a plurality of fingers extending transversely from one or both sides of the track to define a sensing area for each conductive track within the sensing plane. Also the fingers of each conductive track may extend into spaces between the fingers of an adjacent conductive track so that the sensing areas of each conductive track overlap.

In a particularly preferred embodiment the audiovisual teaching apparatus further comprises a flexible plastics sheet with the first array of conductive tracks provided on a first side of the plastics sheet and the second array of conductive tracks provided on a second opposed side of the plastics sheet. The first and second arrays of conductive tracks may comprise a carbon based ink or a metallic based ink printed on the plastics sheet. Also the conductive tracks of the second array are preferably connected to ground to form a ground plane.

Moreover, the audiovisual teaching apparatus may further comprise an outer layer overlying the first array, the outer layer being pre-printed with a musical stave aligned with the conductive tracks of the first array. The outer layer may also include a re-writable surface.

In some embodiments, the audiovisual teaching apparatus ideally comprises a plurality of first arrays of conductive tracks each array corresponding to a separate musical stave.

In the particularly preferred embodiment the untethered handheld antenna includes a battery power supply and the handheld antenna is preferably an omni-directional antenna.

The audiovisual teaching apparatus may further comprise one or more sensors in communication with controller, the one or more sensors being provided for adjustment of the tone or timbre of the sounds produced by the sound reproduction apparatus. The audiovisual teaching apparatus may additionally further comprise one or more sockets for connection with one or more external sources of sounds. The audiovisual teaching apparatus may also include an electric piano keyboard.

In some embodiments, the audiovisual teaching apparatus additionally comprises a radio antenna in communication with the controller, the controller being adapted to cause the sound reproduction apparatus to produce sounds combining one or more musical notes selected using the handheld antenna with sounds and/or musical notes received by the radio antenna. The radio antenna is preferably a WiFi antenna.

BY using first and second arrays of conductive tracks and a local antenna, the audiovisual teaching apparatus is suitable for use in a classroom environment as it is capable of being manufactured in sizes sufficient for easy viewing by larger groups of students without being overly costly in construction. For example the cost of electronic touch-sensitive screens of a size suitable for use in a classroom is generally considered prohibitive.

FIG. 1 shows an example of an audiovisual teaching apparatus 2. The teaching apparatus 2 comprises a substantially rigid frame 6 on which is mounted a board 4. The front surface of the board 4 includes an area 5 treated so as to function as a whiteboard surface whereby the area 5 can be removably written/drawn on using standard dry-maker pens. The rigid frame 6 also includes one or more supports (not shown) to enable the teaching apparatus 2 to be mountable on a wall, placed on a work surface or free-standing. The teaching apparatus 2 is sized to be visible to and used for demonstrations to a group of students simultaneously. Preferably, for example, the teaching apparatus 3 is a minimum of 0.5 m2 and more preferably has sizes equal or greater than 0.8 m×1.5 m.

The whiteboard surface 5 of the board 4 is pre-printed with a plurality of musical staves 8. Although three musical staves are shown in FIG. 1 it is to be understood that the teaching apparatus may be printed with fewer or more than the three staves illustrated in FIG. 1. Each musical stave 8 is accompanied by a respective display 10 which is embedded in the board 4. The display 10 may be a dot matrix display, an LED display or other display for presenting visual information.

The board 4 further includes a musical instrument in the form of a keyboard 12 positioned above the musical staves 8. The keyboard 12 is mounted in an aperture in the board 4 preferably with the individual keys projects slightly forward of the surface of the board 4 so as to be easily accessible to someone wishing to play the keyboard 12. The board 4 additionally includes a chromatic scale tuner display 14, and a plurality of selectable switches 16 (see below). The tuner display 14 is a LED pseudo-analogue display and is used to indicate the tuning of an input sound signal, such as that from a guitar. Various modifications to the relative positions of the musical staves 8, the keyboard 12, the tuner 14, and the switches 16 are envisaged. For example, the keyboard 12 may be positioned below the musical staves 8 and/or the tuner display 14 may be positioned in a lower corner of the board 4.

The teaching apparatus 2 has a power socket (not shown) for connection to an external source of electrical power and sound reproduction apparatus (not shown) is mounted on the rear of the board 4. The sound reproduction apparatus includes, but is not limited to, a MIDI controller, an amplifier and one or more speakers (preferably at least two speakers for stereo sound reproduction). The teaching apparatus 2 also includes both analogue and digital sockets and a plurality of manual controls mounted to the frame 6 for controlling the functionality of the teaching apparatus and the sound reproduction apparatus. The manual controls include, but are not limited to, a volume control, a guitar volume control, a guitar overdrive button, a tuner on/off button, a keyboard on/off button and a power on/off button. The analogue and digital sockets include, but are not limited to, a digital input port, a digital output port, and a guitar jack socket.

The keyboard 12 is connected to the one or more speakers, via the MIDI controller and the amplifier, so that sounds, corresponding to individual keys of the keyboard, are reproduced by the speakers when the keys are manually depressed. The volume of the keyboard sounds is controlled using the manual volume control. The positioning of the keyboard 12 on the teaching apparatus enables finger and hand positions to be clearly demonstrated to others.

Alternatively, an external MIDI-enabled keyboard may be connected to the one or more speakers using the line-in jack. The digital input port may also be used for connecting an mp3 player or a similar music storage device to the teaching apparatus 2. The apparatus 2 can also be directly connected to an electric guitar, or an acoustic instrument with a suitable pickup, using the guitar jack socket so that the sound produced by such instruments is replayed through the speakers of the teaching apparatus. Similarly, the volume of the speakers is adjusted using the guitar volume manual control. The MIDI controller also includes various tone/sound effects and overdrive controls to modify the type, tone and timbre of sound produced by the speakers with respect to either the keyboard 12 or an external musical instrument connected to the line-in jack socket or the guitar jack socket. The tone/sound effects are selected using the switches 16 which may also be used to activate an audible metronome.

Figure 2:
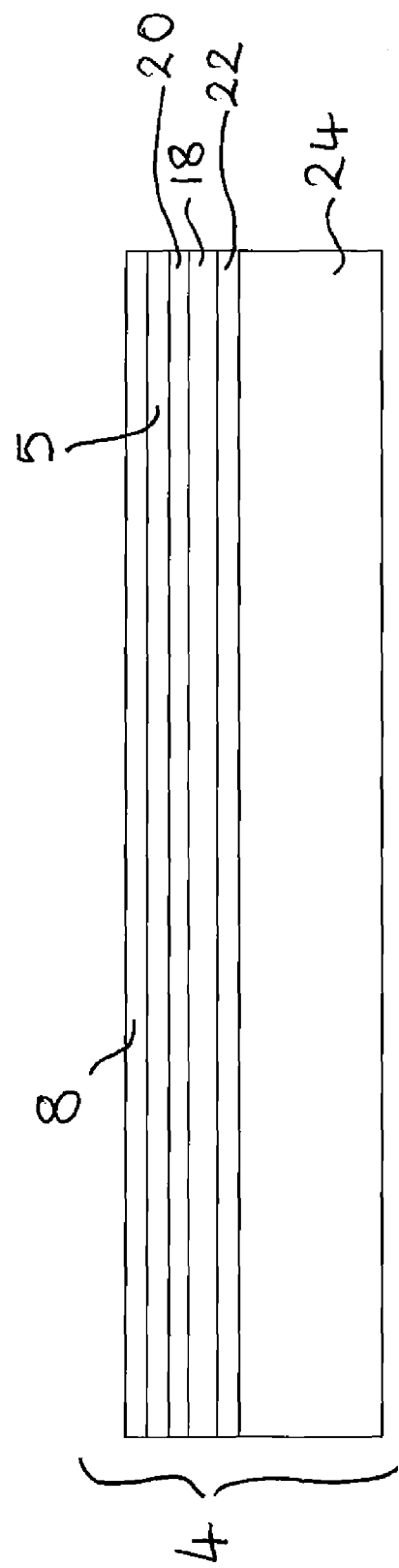
FIG. 2 is a sectional view through the apparatus of FIG. 1.

FIG. 2 is a sectional view of the board 4 but it should be noted that the thickness of each layer is not to scale either absolutely or relatively. The board 4 is constructed from multiple layers supported by a substrate 24 which is preferably lightweight but substantially rigid. For example, the substrate 24 is preferably made from chipboard, cardboard or a plastics foam material. Overlying at least part of one surface of the substrate 24 is a transparent or translucent acetate sheet 18. Part of a first side of the sheet 18, facing away from the substrate 24, is printed with a plurality of first arrays of conductive tracks 20 (three first arrays are required for the teaching apparatus of FIG. 1). Part of the second side of the sheet 18, facing towards the substrate 24, is printed with a second array of conductive tracks 22 which underlie the first array 20. Overlying the first side of the acetate sheet 18 and the first array of conductive tracks 20 is a layer of whiteboard paint 5 which is translucent but obscures sight of the first and second arrays 20, 22. Finally, pre-printed on the outer surface of the whiteboard paint are the musical staves 8 mentioned earlier. Individual conductive tracks 20 of the first array are respectively aligned with the lines and spaces of the music staves 8 and function as individual signal receivers. Whereas the individual conductive tracks 22 of the second array are aligned with the spaces between the conductive tracks 20 and function as guard tracks. The whiteboard paint layer may extend over the whole of the front of the board 4 or may form only a part of the board 4.

Each of the conductive tracks 20 of the first array is separately addressable and all of the conductive tracks of the first and second arrays 20, 22 are arranged substantially parallel with one another. The board 4 has no conductive tracks orthogonal to the first and second arrays 20, 22.

The whiteboard layer 5 is translucent so that LEDs or other point lights mounted in or on the substrate 24 are visible through the whiteboard layer 5. This enables displays, each consisting of one or more light sources such as LEDs, associated with the switches 16 to be mounted on the substrate 24 behind the whiteboard layer 5. Accompanying each of the switch displays 16 is a sensor separate from but working in the same way as the individual conductive tracks 20, 22. Each sensor 16 acts as a switch enabling a user of the teaching apparatus to make changes to the sounds reproduced by the teaching apparatus e.g. flattening or sharpening a note, changing the time signature of the music, transposing the key or clef as well as adjusting the type and timbre of the keyboard or another musical instrument connected to the teaching apparatus. Similar sensors may also accompany each of the displays 10.

The conductive tracks 22 of the second array are connected to each other to form a common ground plane and function to isolate the individual conductive tracks 20 of the first array. The conductive tracks of the first array 20 collectively form a sense plane and each conductive track is individually addressable by a controller and connected to the loudspeaker system via an amplification and demodulation system. In some embodiments, ideally a "n to 1" de-multiplexer is used to manage signals received from individual tracks of the first array 20.

Figure 3:
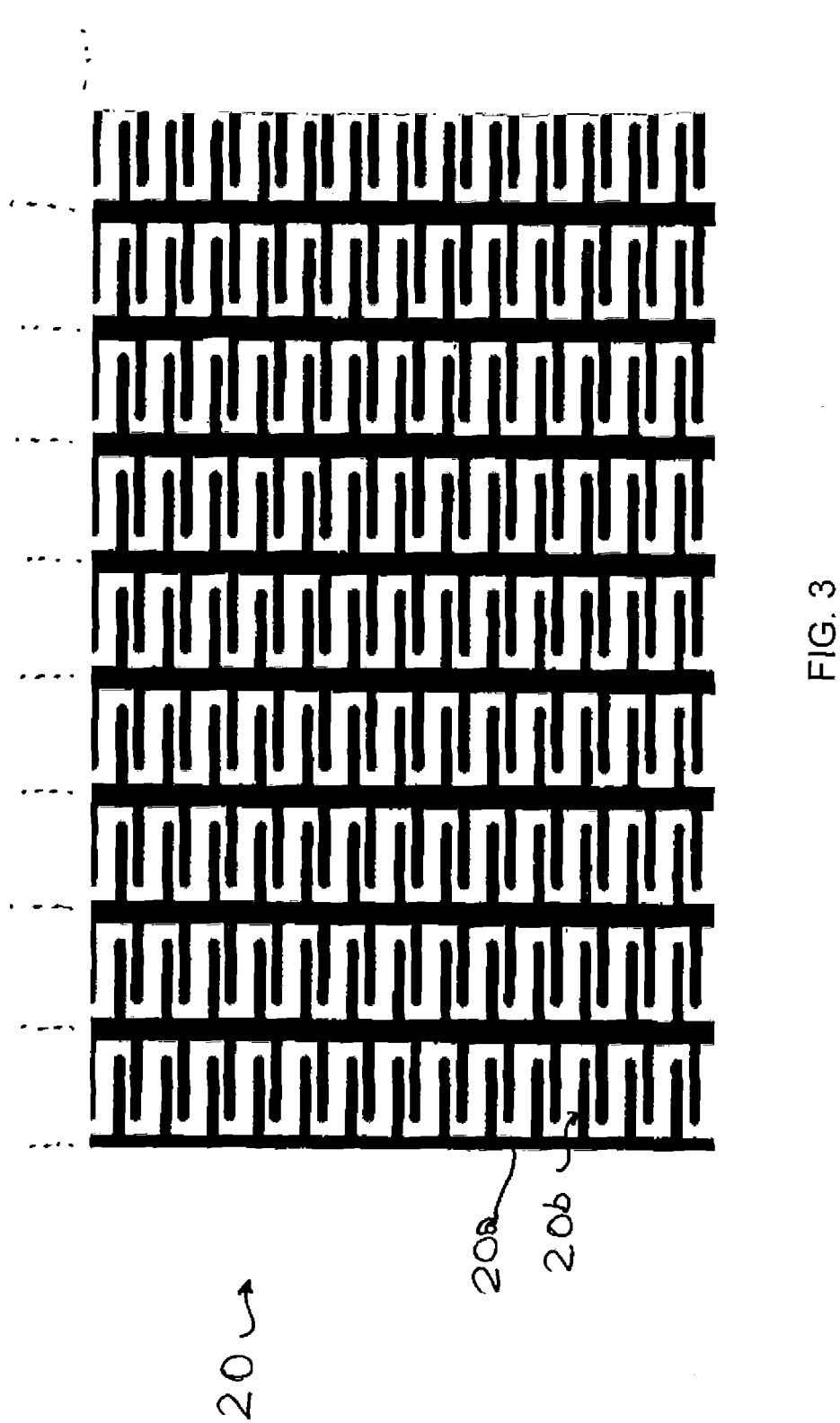
FIG. 3 illustrates part of the sensing plane of the audiovisual teaching apparatus of FIG. 1.

The conductive tracks 20, 22 and the sensors associated with each of the switches 16 are formed using a conductive ink. The conductive ink is preferably a carbon based ink or a metallic based ink. For example, silver or palladium based ink would be equally effective as the conductive ink. The use of the conductive ink printed onto the sheet 18 allows a high degree of mechanical accuracy and repeatability to be obtained. A preferred array of first conductive tracks 20 is shown in FIG. 3. Each individual track 20a includes evenly spaced fingers 20b that extend transversely from one or both sides of the track 20a. For a pair of adjacent tracks 20a, the fingers 20b of one track extend into the spaces between the fingers of the other track, as illustrated, but each track 20a and its fingers 20b are electrically isolated from adjacent tracks. Each track 20a with its associated fingers 20b thereby defines a sensing area within the sensing plane which overlaps with the sensing areas of adjacent tracks. The ground tracks 22 may be printed using a similar pattern to that shown in FIG. 3 or, alternatively, may be simply a series of lines parallel with one another and with the tracks 20a of the first array.

As shown in FIG. 1 the apparatus 2 also includes a hand-held wand 26. The wand 26 is a standalone device powered by an internal rechargeable battery. As the wand 26 is powered by an internal rechargeable battery, it is free to be moved independently of the board 4 and is not required to be tethered or otherwise physically connected to the board 4. Within the main body of the wand 26 a microcontroller and a signal generator are provided for generating a variable frequency, variable amplitude, pseudo-sinusoidal waveform using waveform shaping filter components. The tip of the wand 26 includes an omni-directional antenna to transmit the waveform. The omni-directional antenna is preferably in the form of a pair of loops with a ferrite core with one of the two loops overlapping the other at substantially 90°. The wand 26 also includes a movement operated switch configured to place the wand 26 in an ultra-low power mode after several minutes of inactivity. The movement operated switch is an alternative to or additional to a conventional on/off power switch.

The wand 26 is preferably powered using one or more rechargeable batteries, e.g. 3.7 v or 9 v batteries, sufficient to transmit a local, low frequency signal. Reference herein to low frequency is to be understood as reference to frequencies lower than existing commercial radio frequencies, for example 10 kHz. Furthermore, the use of a pseudo-sinusoidal waveform for the transmitted signal, as opposed to a square wave waveform, reduces and preferably eliminates local EMC effects.

In use, the wand 26 is powered up and so starts transmitting a local low-frequency signal. The area of reception of the low-frequency signals transmitted by the tip of the wand 26 is, in some embodiments, preferably no greater than and ideally is smaller than the spacing between adjacent tracks 20a in the first array. With the teaching apparatus 2 connected to an external power supply, the controller of the board 4 repeatedly addresses in series each of the tracks 20a of the first array. When the tip of the wand 26 is held close to the front of the teaching apparatus, adjacent a selected note on one of the lines or spaces of the one of the musical staves 8, the low-frequency signal is received by one or more of the tracks of the first array 20. As the transmission of the waveform is voltage based, rather than current pulse based, the high resistance offered by the conductive ink of the tracks 20a allows the transmitted waveform to be received linearly across the length of a conductive track. The second array 22 isolates individual tracks of the first array 20 so that signals received in one track 20a of the first array do not induce signals in an adjacent track. However, depending upon the resolution of the first array with respect to the musical staves and the accuracy of a person using the wand 26, the low-frequency signal transmitted by the wand may be picked up by more than one track 20a. The controller therefore compares the amplitude of any signals received by the tracks in the first array to identify individual peaks indicative of a particular stave line or space having been selected by the wand 26.

Where a single wand is used to select a single note, the controller need only identify the note of the musical stave associated with the track 20a that received the signal with maximum amplitude. Where a plurality of wands are to be used simultaneously, more complex processing by the controller of the signals received by the tracks 20a is required. Distinguishing between multiple wands 26 may be performed in a number of different ways. For example, each wand may transmit a different unique signal and the track that has the maximum amplitude for a particular signal is deemed selected by a particular wand. An alternative approach requires the resolution of the first array to be increased so that at least two tracks are associated with each line or space of the musical stave. With this greater resolution the controller is able to identify individual selected musical notes on a stave (even if they are adjacent notes) by identifying pairs of adjacent tracks with a predetermined signal amplitude difference between them.

Thus the signals from each of the tracks 20a passes through the amplifier and demodulation system to the controller via an analogue-to-digital converter. A firmware algorithm on the controller performs a series of threshold measurements and comparisons to determine that a signal from the wand 26 has been detected and, optionally, to then build up a tabulation of the lines or spaces of the staves where signal detection has occurred before generating the corresponding musical note or notes via the integrated MIDI controller. The use of a sufficiently high microcontroller clock speed ensures negligible latency in the generation of the musical notes.

The visual indictors 10 are used to indicate the musical key that is allocated to the corresponding musical stave 8. The visual indicators 10 also display additional information about the allocated musical key. For example, the visual indicators may display whether the allocated musical key is major or minor and whether it is sharpened or flattened.

Although only one exemplary embodiment has been described in detail above accompanied by examples of changes that may be made to the embodiment, those skilled in the art will readily appreciate that many other modifications are possible in the exemplary embodiment without departing from the novel teachings and advantages of the present disclosure. Accordingly, all such modifications are intended to be included within the scope of the present disclosure and as defined in the following claims. For example although the board 4 is shown in FIG. 2 with the musical staves printed on the outer surface, it is also envisaged that a transparent glass or plastics protective cover, e.g. polycarbonate, may be laid over the outer surface of the first array 20 with the surface of the cover adjacent the first array being reverse printed with the musical staves and with a translucent white paint. This protects the pre-printed musical staves and graphical overlays from external damage such as scratching. Similarly, the visual indicators 10, displays 16 and the tuner 14, along with any additional lights and/or information screens are preferably mounted in the supporting substrate 24 behind the acetate or protective cover whilst still remaining visible. Also, the speakers may be mounted to the frame edge 6 or to the front of the teaching apparatus 2 as opposed to the rear.

It is also envisaged that the teaching apparatus 2 may include a WiFi antenna to enable wireless communication with one or more local electronic devices such as, but not limited to, tablet computers. The WiFi antenna is preferably embedded in the teaching apparatus and in communication with the signal controller. Alternatively the WiFi antenna may be a peripheral component connected to the line-in port of the teaching apparatus. Use of a WiFi antenna enables the teaching apparatus 2 to additionally receive wireless inputs from one or more local electronics devices so that the music produced by the speakers may be a combination of inputs from the wand 26 by a teacher with wireless inputs from students.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. An audiovisual teaching apparatus for use in teaching music comprising:
    a substrate;
    a sensing plane formed of a first array of conductive tracks provided on the substrate, each of the conductive tracks of the first array being associated with a respective different musical note of a musical stave;
    a second array of conductive tracks provided on the substrate, the second array of conductive tracks being interspersed with the first array of conductive tracks;
    sound reproduction apparatus;
    a music controller in communication with the first array of conductive tracks and with the sound reproduction apparatus; and
    an untethered handheld antenna
    whereby, when a conductive track of the first array receives a signal transmitted by the handheld antenna, the controller is adapted to cause the sound reproduction apparatus to generate a sound corresponding to the musical note associated with the conductive track that received the transmitted signal.

2. The audiovisual teaching apparatus as claimed in claim 1, wherein each of the conductive tracks of the first array is individually addressable.

3. The audiovisual teaching apparatus as claimed in claim 1, wherein each conductive track of the first array includes a plurality of fingers extending transversely from one or both sides of the track to define a sensing area for each conductive track within the sensing plane.

4. The audiovisual teaching apparatus as claimed in claim 3, wherein the fingers of each conductive track extend into spaces between the fingers of an adjacent conductive track so that the sensing areas of each conductive track overlap.

5. The audiovisual teaching apparatus as claimed in claim 1, wherein all of the conductive tracks of the first and second arrays are arranged substantially parallel with one another.

6. The audiovisual teaching apparatus as claimed in claim 1, further comprising a flexible plastics sheet wherein the first array of conductive tracks is provided on a first side of the plastics sheet and the second array of conductive tracks is provided on a second opposed side of the plastics sheet.

7. The audiovisual teaching apparatus as claimed in claim 6, wherein the first and second arrays of conductive tracks comprise a carbon based ink or a metallic based ink printed on the plastics sheet.

8. The audiovisual teaching apparatus as claimed in claim 1, wherein the conductive tracks of the second array are connected to ground to form a ground plane.

9. The audiovisual teaching apparatus as claimed in claim 6, further comprising an outer layer overlying the first array, the outer layer being pre-printed with a musical stave aligned with the conductive tracks of the first array.

10. The audiovisual teaching apparatus as claimed in claim 6, further comprising an outer layer overlying the first array, the outer layer being pre-printed with a musical stave aligned with the conductive tracks of the first array and the outer layer including a re-writable surface.

11. The audiovisual teaching apparatus as claimed in claim 1, further comprising a plurality of first arrays of conductive tracks each array corresponding to a separate musical stave.

12. The audiovisual teaching apparatus as claimed in claim 1, wherein the untethered handheld antenna includes a battery power supply.

13. The audiovisual teaching apparatus as claimed in claim 12, wherein the handheld antenna is an omni-directional antenna.

14. The audiovisual teaching apparatus as claimed in claim 1, further comprising one or more sensors in communication with controller, the one or more sensors being provided for adjustment of the tone or timbre of the sounds produced by the sound reproduction apparatus.

15. The audiovisual teaching apparatus as claimed in claim 1, further comprising one or more sockets for connection with one or more external sources of sounds.

16. The audiovisual teaching apparatus as claimed in claim 1, further comprising a radio antenna in communication with the controller, the controller being adapted to cause the sound reproduction apparatus to produce sounds combining one or more musical notes selected using the handheld antenna with sounds and/or musical notes received by the radio antenna.

17. The audiovisual teaching apparatus as claimed in claim 16, wherein the radio antenna is a WiFi antenna.

18. The audiovisual teaching apparatus as claimed in claim 1, further comprising an electric piano keyboard.

* * * * *